United States Patent
Lenner et al.

(10) Patent No.: US 12,203,797 B2
(45) Date of Patent: Jan. 21, 2025

(54) TRANSDUCER FOR NON-INVASIVE MEASUREMENT

(71) Applicant: ABB Schweiz AG, Baden (CH)

(72) Inventors: Miklos Lenner, Daettwil (CH); Frank Kassubek, Rheinfelden (DE); Christof Bernhard, Aarau (CH); Detlef Pape, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 544 days.

(21) Appl. No.: 17/192,910

(22) Filed: Mar. 5, 2021

(65) Prior Publication Data

US 2021/0190571 A1    Jun. 24, 2021

Related U.S. Application Data

(63) Continuation of application No. PCT/EP2019/073504, filed on Sep. 4, 2019.

(30) Foreign Application Priority Data

Sep. 6, 2018 (EP) .................................... 18192850

(51) Int. Cl.
*G01F 23/296* (2022.01)
*B06B 1/02* (2006.01)
(Continued)

(52) U.S. Cl.
CPC .......... *G01F 23/296* (2013.01); *B06B 1/0269* (2013.01); *B06B 1/0644* (2013.01);
(Continued)

(58) Field of Classification Search
CPC ... G01F 23/296; B06B 1/0269; B06B 1/0644; B06B 2201/55; B06B 2201/74; B06B 2201/71; G01N 29/024; G01N 29/2437
See application file for complete search history.

(56) References Cited

U.S. PATENT DOCUMENTS 3,588,797 A * 6/1971 Triebold ................ H04R 1/406
367/901
5,121,361 A 6/1992 Harrison, Jr. et al.
(Continued)

FOREIGN PATENT DOCUMENTS

CN 102183197 A * 9/2011
CN 106338320 A 1/2017
(Continued)

OTHER PUBLICATIONS

"Transducer Beam Spread" by Iowa State University Center for Nondestructive Evaluation, entire attached document (Year: 2021).*
(Continued)

*Primary Examiner* — Catherine T. Rastovski
*Assistant Examiner* — Drexel Alejandro Venero
(74) *Attorney, Agent, or Firm* — Leydig, Voit & Mayer, Ltd.

(57) ABSTRACT

A transducer for non-invasive measurement includes: a piezoelectric element; a base plate; and driver electronics. The piezoelectric element is mounted to a first face of the base plate. A second face of the base plate is mountable to a wall of a vessel that holds a liquid. The driver electronics drive the piezoelectric element at a plurality of activation frequencies. When the second face of the base plate is mounted to the wall of the vessel, the transducer when activated excites acoustic waves in the base plate and to launch an acoustic wave into the liquid. The transducer is designed such that an angular divergence of the acoustic wave launched into the liquid varies as a function of at least the activation frequency and a dimension of an emitter.

11 Claims, 6 Drawing Sheets

(51) Int. Cl.
  *B06B 1/06* (2006.01)
  *G01N 29/024* (2006.01)
  *G01N 29/24* (2006.01)

(52) U.S. Cl.
  CPC ........ *G01N 29/024* (2013.01); *B06B 2201/55* (2013.01); *B06B 2201/74* (2013.01); *G01N 29/2437* (2013.01)

(56) References Cited

U.S. PATENT DOCUMENTS

| | | |
|---|---|---|
| 5,196,755 A | 3/1993 | Shields |
| 5,243,567 A | 9/1993 | Gingerich |
| 10,215,613 B2 | 2/2019 | Kassubek et al. |
| 10,228,275 B2 | 3/2019 | Kaufmann et al. |
| 2004/0173021 A1 | 9/2004 | Lizon et al. |
| 2007/0276237 A1 | 11/2007 | Li |
| 2008/0088205 A1* | 4/2008 | Kawakatsu ............ H02N 2/028 318/116 |
| 2009/0025474 A1 | 1/2009 | Lagergren |
| 2009/0153221 A1* | 6/2009 | Aeby ................ B06B 1/0276 327/361 |
| 2009/0282910 A1 | 11/2009 | Bitar et al. |
| 2009/0314080 A1 | 12/2009 | Bitar et al. |
| 2017/0010146 A1 | 1/2017 | Kassubek et al. |

FOREIGN PATENT DOCUMENTS

| | | | |
|---|---|---|---|
| CN | 106441507 A | 2/2017 | |
| EP | 1065009 A1 * | 1/2001 | ............... B06B 3/00 |
| EP | 3115779 A1 | 1/2017 | |
| GB | 2012957 A1 | 8/1979 | |
| RU | 2104618 C1 | 2/1998 | |
| WO | WO 2016134005 A1 | 8/2016 | |
| WO | WO 2016180636 A1 | 11/2016 | |

OTHER PUBLICATIONS

European Patent Office, Communication under Rule 71(3) EPC in cognate European Patent Application No. 19762796.1, 39 pp. (Feb. 8, 2022).

Chinese National Intellectual Property Administration, Office Action in Chinese Patent Application No. 201980058243.1, 12 pp. (Jan. 30, 2022).

Na Ji et al: "Technologies for imaging neural activity in large volumes", Nature Neuroscience, Sep. 2016 (Sep. 1, 2016), pp. 1154-1164, vol. 19, No. 9, 2016 Nature America Inc., New York, USA.

* cited by examiner

TRANSDUCER FOR NON-INVASIVE MEASUREMENT

CROSS-REFERENCE TO PRIOR APPLICATION

This application is a continuation of International Patent Application No. PCT/EP2019/073504, filed on Sep. 4, 2019, which claims priority to European Patent Application No. EP 18192850.8, filed on Sep. 6, 2018. The entire disclosure of both applications is hereby incorporated by reference herein.

FIELD

The present invention relates to a transducer for non-invasive measurement and an associated non-invasive measurement method, transducer systems for non-invasive measurement and associated non-invasive measurement methods.

The term "transducer" is used here and throughout this document to comprise both sender, sometimes also called an emitter, and receive; a transducer in the context of this document is a unit that is capable of generating and receiving signals.

BACKGROUND

Various acoustic sensor applications require control of certain beam parameters, including beam divergence. Piezoelectric arrays that are driven by phase shifted electric signals can be used in order to control the divergence of an acoustic beam. Applications that make use of beam divergence, include acoustic level and flow measurement, which require divergence control of acoustic beams that are radiated in a normal direction to the transducer plane. For the measurement of sound speed across the tank, a beam with low divergence is required in order to maintain the intensity of the acoustic signal even at large propagation distances. In contrast, for level measurement through a tank bottom or vertical sound speed calibration scheme, a beam with higher divergence may be desired, which allows flexible positioning of the transducer on round bottoms as well as the application of the same transducer for various opening angles on conical bottomed tanks. Similar considerations apply to acoustic flow measurement, in which a low and high divergences beam is required for the sound speed calibration and the flow measurement respectively. In consequence, acoustic transducers are required to generate different—angular—emission patterns. In order to fulfil these requirements, acoustic transducers have been proposed that use piezoelectric arrays with multiple piezoelectric elements—see US2007/0276237A1, WO2016/134005A1 and WP2016/180636A1. Varying the number of activated elements as well as the amplitude and the phase of the excitation signal enables the control of the radiation characteristics of the beam. Although these transducers are ideally suited for the generation of nearly arbitrary beam profiles, the technology is associated with high complexity (and thus costly) electronics and wiring schemes—see U.S. Pat. No. 5,121,361A. Alternatively, complex positioning mechanisms are used for setting the beam divergence by contacting the appropriate transducer site with preset radiation characteristics to the target object—see GB2012957A. In addition, passive beam shaping systems can be utilised that typically exhibit higher acoustic losses—see U.S. Pat. No. 5,243,567A and RU2104618C1.

There is a need to provide improved techniques for non-invasive measurement.

SUMMARY

In an embodiment, the present invention provides a transducer for non-invasive measurement, comprising: a piezoelectric element; a base plate; and driver electronics, wherein the piezoelectric element is mounted to a first face of the base plate, wherein a second face of the base plate is configured to be mounted to a wall of a vessel configured to hold a liquid, wherein the driver electronics are configured to drive the piezoelectric element at a plurality of activation frequencies, wherein when the second face of the base plate is mounted to the wall of the vessel, the transducer when activated is configured to excite acoustic waves in the base plate and to launch an acoustic wave into the liquid, and wherein the transducer is configured such that an angular divergence of the acoustic wave launched into the liquid varies as a function of at least the activation frequency and a dimension of an emitter.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved transducer for non-invasive measurement and an improved non-invasive measurement method.

It should be noted that the following described aspects of the invention apply also for the transducer for non-invasive measurement, the transducer systems for non-invasive measurement and for the non-invasive measurement methods.

In a first aspect, there is provided a transducer for non-invasive measurement, comprising:
   a piezoelectric element;
   a base plate; and
   driver electronics.

The piezoelectric element is mounted to a first face of the base plate. A second face of the base plate is configured to be mounted to a wall of a vessel. The term "vessel" is used here and throughout this document in a broad sense, not being limited to a closed container, but also including containers that are at least partly open, and also including tubes or plumbing or pipelines that are configured to contain or guide any kind of media, such as liquids, liquified solids or gases of all kinds. The vessel is configured to contain a liquid. The driver electronics is configured to drive the piezoelectric element at a plurality of activation frequencies. When the second face of the base plate is mounted to the wall of the vessel, the transducer when activated is configured to excite acoustic waves in the base plate and to launch an acoustic wave into the liquid. The transducer is configured such that an angular divergence of the acoustic wave launched into the liquid varies as a function of at least the activation frequency and emitter dimensions. In other words, the transducer uses different activation frequencies in order to generate acoustic beams with different angular patterns; especially to change the angular divergence of the emitted sound beams, e.g. defined by the angle at which the amplitude of the sound signal drops down to 50% of the maximum amplitude around a certain direction.

In this manner, control of beam divergence is provided without the need for multiple piezoelectric elements, simple electronics can be utilized, with high design flexibility.

In other words, a simple configuration is provided which comprises a coupling body, also called abase plate, which can in an embodiment be wedged, and a single piezoelectric element (plate or disc) attached to it. The piezoelectric element is mounted on a face of the coupling body that is parallel to the wall surface or that can be inclined, typically only slightly, with respect to this plane. The piezoelectric element is operated at frequencies, that can be resonant, in order to excite acoustic waves in the base material, which are irradiated into the surrounding liquid (or solid medium) close to normal direction to the base plate. Excitation different frequencies (that can correspond to longitudinal or lateral resonances) enables the control of the beam divergence.

In an example, the plurality of activation frequencies are resonance frequencies of the piezoelectric element.

This provides for increased efficiency due to resonant operation.

In an example, the resonance frequencies are longitudinal or lateral resonance frequencies.

In an example, the acoustic wave launched into the liquid is directed at an angle close to 90 degrees to the second surface of the base plate.

In an example, the transducer is configured such that the angular divergence of the acoustic wave launched into the liquid increases as the activation frequency decreases.

In an example, the angular divergence of the acoustic wave launched into the liquid varies as a function of at least a dimension of the piezoelectric element.

In an example, the angular divergence of the acoustic wave launched into the liquid is large when a speed of sound in the liquid divided by a first range of activation frequencies is greater than a dimension of the piezoelectric element.

In an example, the angular divergence of the acoustic wave launched into the liquid is small when a speed of sound in the liquid divided by a second range of activation frequencies is equal to or less than a dimension of the piezoelectric element.

In an example, the drive electronics is configured to drive the piezoelectric element at two or more frequencies at the same time.

In an example, the base plate can be wedge shaped.

It is noted that a good emitter also is a good receiver with filtering characteristics similar to the emitted sound pattern.

In a second aspect, there is provided a non-invasive measurement method, comprising:
   a) mounting a transducer to a vessel containing a liquid, wherein the transducer comprises a piezoelectric element, a base plate, and driver electronics, wherein the piezoelectric element is mounted to a first face of the base plate, wherein a second face of the base plate is mounted to a wall of the vessel, wherein the vessel is configured to hold a liquid, wherein the drive electronics is configured to drive the piezoelectric element at a plurality of activation frequencies;
   b) activating the piezoelectric element by the driver electronics to excite acoustic waves in the base plate and launch an acoustic wave into the liquid, wherein the driver electronics is configured to drive the piezoelectric element at a plurality of activation frequencies, and an angular divergence of the acoustic wave launched into the liquid varies as a function of at least the activation frequency.

In a third aspect, there is provided a transducer system for non-invasive measurement, comprising:
   a transmitter; and
   a receiver.

The transmitter and the receiver comprise a piezoelectric element, a base plate, and driver electronics. The driver electronics can also be part of an independent unit that is physically separated from the transducer.

The piezoelectric element is mounted to a first face of the base plate. A second face of the base plate is mounted to a wall of a vessel at a first position to mount the transmitter to the wall of a vessel containing a liquid. The receiver is mounted to the wall of the vessel at a second position laterally spaced from the first position. The driver electronics is configured to drive the piezoelectric element at a plurality of activation frequencies. Activation at an activation frequency is configured to excite acoustic waves in the base plate and to launch an acoustic wave into the liquid. The transmitter is configured such that an angular divergence of the acoustic wave launched into the liquid varies as a function of at least the activation frequency. The transmitter is configured to launch a first acoustic wave into the liquid having a first angular divergence and configured to launch a second acoustic wave into the liquid having a second angular divergence greater than the first angular divergence. The first angular divergence and lateral spacing are such that the first acoustic wave can reflect off a surface of the liquid and be detected by the transmitting transducer but not detected by the receiver. The second angular divergence and lateral spacing are such that the second acoustic wave can reflect off the surface of the liquid and be detected by the receiver.

In an example, the transmitter is mounted to the bottom of the vessel.

In an example, the receiver is mounted to the bottom of the vessel.

In a fourth aspect, there is provided a non-invasive measurement method, comprising:
- a) mounting a transmitting transducer to a wall of a vessel containing a liquid, wherein the transducer comprises a piezoelectric element, a base plate, and driver electronics, and wherein the piezoelectric element is mounted to a first face of the base plate, and wherein a second face of the base plate is mounted to a wall of the vessel at a first position; wherein, the driver electronics is configured to drive the piezoelectric element at a plurality of activation frequencies, wherein activation at an activation frequency is configured to excite acoustic waves in the base plate and to launch an acoustic wave into the liquid and wherein the transducer is configured such that an angular divergence of the acoustic wave launched into the liquid varies as a function of at least the activation frequency and emitter dimensions;
- b) mounting a receiver to the wall of the vessel at a second position laterally spaced from the first position;
- c) driving the piezoelectric element at a first activation frequency to launch a first acoustic wave into the liquid having a first angular divergence; and
- d) driving the piezoelectric element at a second activation frequency to launch a second acoustic wave into the liquid having a second angular divergence greater than the first angular divergence; wherein, the first angular divergence and lateral spacing are such that the first acoustic wave reflects off a surface of the liquid and is detected by the transducer but is not detected by the receiver, and wherein the second angular divergence and lateral spacing are such that the second acoustic wave reflects off the surface of the liquid and is detected by the receiver.

In an example, the transmitter is mounted to the bottom of the vessel.

In an example, the receiver is mounted to the bottom of the vessel.

In a fifth aspect, there is provided a transducer system for non-invasive measurement, comprising:
- a first transducer; and
- a second transducer.

The first transducer comprises a first piezoelectric element, a first base plate, and first driver electronics. The first piezoelectric element is mounted to a first face of the first base plate. The second transducer comprises a second piezoelectric element, a second base plate, and second driver electronics. The second piezoelectric element is mounted to a first face of the second base plate. A second face of the first base plate is mounted to a side wall of a vessel containing a liquid to mount the first transducer to the vessel. A second face of the second base plate is mounted to a bottom wall of the vessel to mount the second transducer to the vessel. The first driver electronics is configured to drive the first piezoelectric element at an activation frequency to activate the first transducer to launch a first acoustic wave into the liquid having a first angular divergence. The second driver electronics is configured to drive the second piezoelectric element at an activation frequency to activate the second transducer to launch a second acoustic wave into the liquid having a second angular divergence greater than the first angular divergence. The first transducer is configured to detect a reflected acoustic wave of the first acoustic wave. The second transducer is positioned such that the second acoustic wave can reflect off the surface of the liquid and be detected by the second transducer.

In an example, the second driver electronics is configured to drive the second piezoelectric element at a plurality of activation frequencies. The second transducer is configured such that the angular divergence of the second acoustic wave launched into the liquid varies as a function of at least the activation frequency and the emitter dimensions.

In an example, the first driver electronics is configured to drive the first piezoelectric element at a plurality of activation frequencies. The first transducer is configured such that the angular divergence of the second acoustic wave launched into the liquid varies as a function of at least the activation frequency.

In a sixth aspect, there is provided a non-invasive measurement method, comprising:
- a) mounting a first transducer to a vessel containing a liquid, wherein the first transducer comprises a first piezoelectric element, a first base plate, and first driver electronics, wherein the first piezoelectric element is mounted to a first face of the first base plate, and wherein, a second face of the first base plate is mounted to a side wall of the vessel to mount the first transducer to the vessel;
- b) mounting a second transducer to the vessel, wherein the second transducer comprises a second piezoelectric element, a second base plate, and second driver electronics, wherein the second piezoelectric element is mounted to a first face of the second base plate, wherein a second face of the second base plate is mounted to a bottom wall of the vessel to mount the second transducer to the vessel;
- c) driving the first piezoelectric element with the first driver electronics at an activation frequency to activate the first transducer to launch a first acoustic wave into the liquid having a first angular divergence;
- d) driving the second piezoelectric element with the second driver electronics at an activation frequency to activate the second transducer to launch a second acoustic wave into the liquid having a second angular divergence greater than the first angular divergence;
- e) detecting with the first transducer a reflected first acoustic wave, and
- f) detecting with the second transducer a reflected second acoustic wave that has been reflected off a surface of the liquid.

In an example, the second driver electronics is configured to drive the second piezoelectric element at a plurality of activation frequencies. The second transducer is configured such that the angular divergence of the second acoustic wave launched into the liquid varies as a function of at least the activation frequency and the emitter dimensions.

In an example, the first driver electronics is configured to drive the first piezoelectric element at a plurality of activation frequencies. The first transducer is configured such that the angular divergence of the second acoustic wave launched into the liquid varies as a function of at least the activation frequency and the emitter dimensions.

The above aspects and examples will become apparent from and be elucidated with reference to the embodiments described hereinafter.

Figure 1:
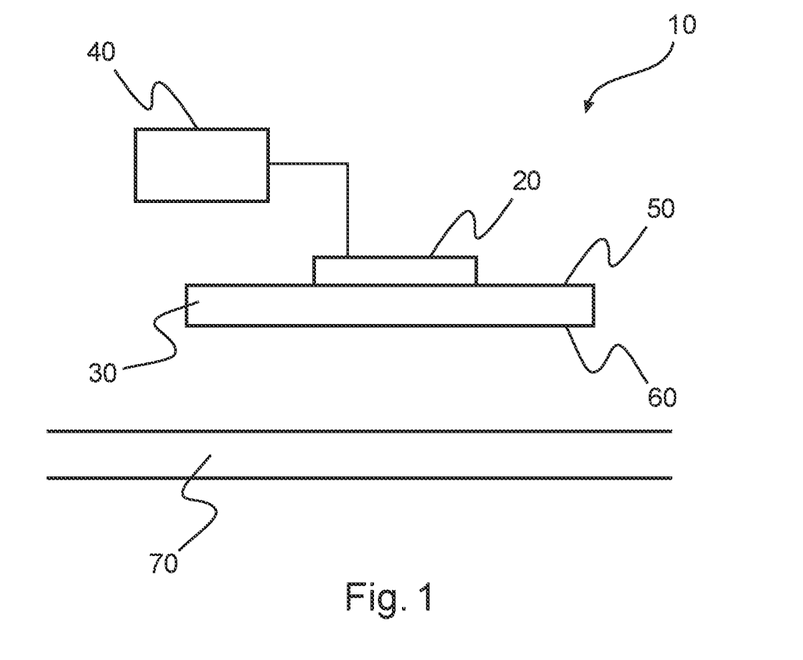
FIG. 1 shows a schematic representation of a transducer for non-invasive measurement.

FIG. 1 shows an example of a transducer 10 for non-invasive measurement. The transducer comprises a piezoelectric element 20, a base plate 30, and driver electronics 40. The piezoelectric element is mounted to a first face 50 of the base plate. A second face 60 of the base plate is configured to be mounted to a wall 70 of a vessel. The vessel is configured to hold a liquid. The driver electronics is configured to drive the piezoelectric element at a plurality of activation frequencies. When the second face of the base plate is mounted to the wall of the vessel, the transducer when activated is configured to excite acoustic waves in the base plate and to launch an acoustic wave into the liquid. The transducer is configured such that an angular divergence of the acoustic wave launched into the liquid varies as a function of at least the activation frequency.

According to an example, the plurality of activation frequencies are resonance frequencies of the piezoelectric element.

According to an example, the resonance frequencies are longitudinal or lateral resonance frequencies.

According to an example, the acoustic wave launched into the liquid is directed at an angle close to 90 degrees to the second surface of the base plate.

According to an example, the transducer is configured such that the angular divergence of the acoustic wave launched into the liquid increases as the activation frequency decreases.

According to an example, the angular divergence of the acoustic wave launched into the liquid varies as a function of at least a dimension of the piezoelectric element.

According to an example, the angular divergence of the acoustic wave launched into the liquid is large when a speed of sound in the liquid divided by a first range of activation frequencies is greater than a lateral dimension of the piezoelectric element.

According to an example, the angular divergence of the acoustic wave launched into the liquid is small when a speed of sound in the liquid divided by a second range of activation frequencies is equal to or less than a lateral dimension of the piezoelectric element.

According to an example, the drive electronics is configured to drive the piezoelectric element at two or more frequencies at the same time.

According to an example, the base plate can be wedge shaped.

Figure 2:
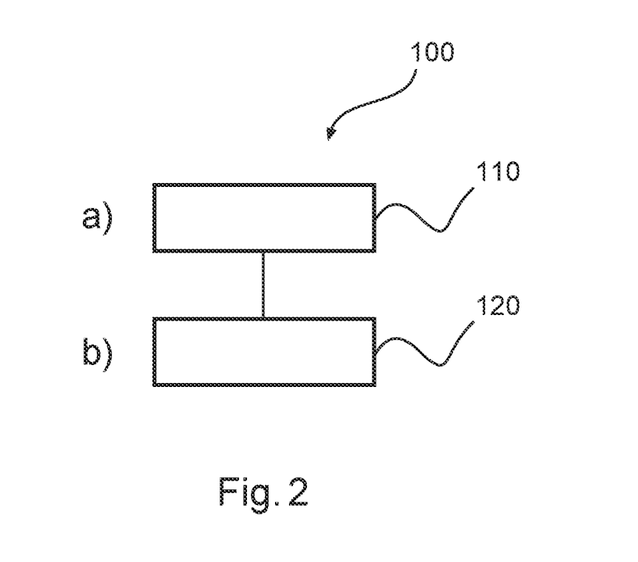
FIG. 2 shows a non-invasive measurement method.

FIG. 2 shows a non-invasive measurement method 100 in its basic steps. The method comprises:
- in a mounting step 110, also referred to as step a), mounting a transducer to a vessel containing a liquid, wherein the transducer comprises a piezoelectric element, a base plate, and driver electronics, wherein the piezoelectric element is mounted to a first face of the base plate, wherein a second face of the base plate is mounted to a wall of the vessel, wherein the vessel is configured to hold a liquid, wherein the drive electronics is configured to drive the piezoelectric element at a plurality of activation frequencies;
- in an activating step 120, also referred to as step b), activating the piezoelectric element by the driver electronics to excite acoustic waves in the base plate and launch an acoustic wave into the liquid, wherein the driver electronics is configured to drive the piezoelectric element at a plurality of activation frequencies, and an angular divergence of the acoustic wave launched into the liquid varies as a function of at least the activation frequency.

In an example, the plurality of activation frequencies are resonance frequencies of the piezoelectric element.

In an example, the resonance frequencies are longitudinal or lateral resonance frequencies.

In an example, the acoustic wave launched into the liquid is directed at an angle close to 90 degrees to the second surface of the base plate.

In an example, the transducer is configured such that the angular divergence of the acoustic wave launched into the liquid increases as the activation frequency decreases.

In an example, the angular divergence of the acoustic wave launched into the liquid varies as a function of at least a dimension of the piezoelectric element.

In an example, the angular divergence of the acoustic wave launched into the liquid is large when a speed of sound in the liquid divided by a first range of activation frequencies is greater than a lateral dimension of the piezoelectric element.

In an example, the angular divergence of the acoustic wave launched into the liquid is small when a speed of sound in the liquid divided by a second range of activation frequencies is equal to or less than a lateral dimension of the piezoelectric element.

In an example, the driver electronics is configured to drive the piezoelectric element at two or more frequencies at the same time.

In an example, the base plate can be wedge shaped.

Figure 3:
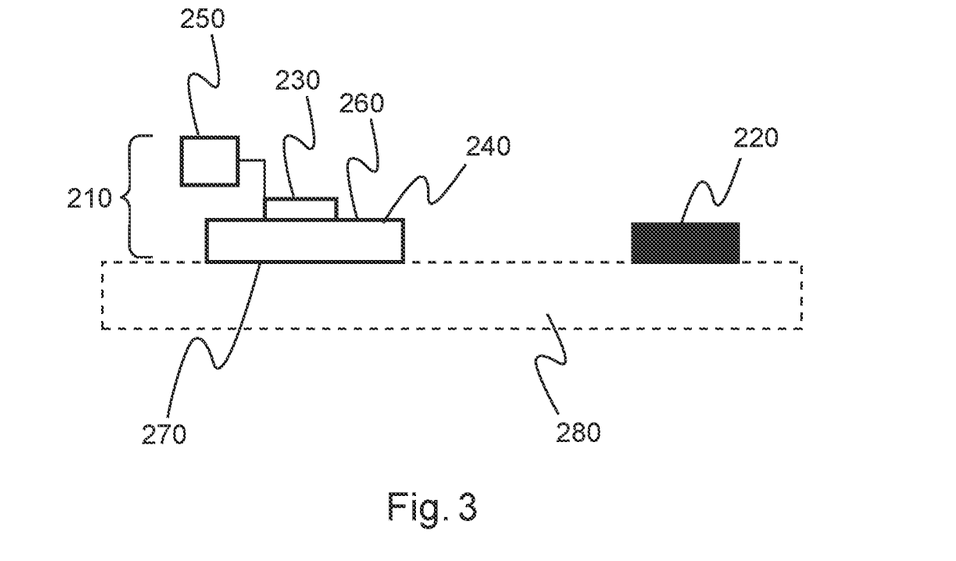
FIG. 3 shows a schematic representation of a transducer system for non-invasive measurement.

FIG. 3 shows an example of a transducer system 200 for non-invasive measurement. The transducer system comprises a transducer 210, and a receiver 220. The transducer comprises a piezoelectric element 230, a base plate 240, and driver electronics 250. The piezoelectric element is mounted to a first face 260 of the base plate. A second face 270 of the base plate is mounted to a wall 280 of a vessel at a first position to mount the transducer to the wall of a vessel containing a liquid. The receiver is mounted to the wall of the vessel at a second position laterally spaced from the first position. The driver electronics is configured to drive the piezoelectric element at a plurality of activation frequencies. Activation at an activation frequency is configured to excite acoustic waves in the base plate and to launch an acoustic wave into the liquid. The transducer is configured such that an angular divergence of the acoustic wave launched into the liquid varies as a function of at least the activation frequency. The transducer is configured to launch a first acoustic wave into the liquid having a first angular divergence and configured to launch a second acoustic wave into the liquid having a second angular divergence greater than the first angular divergence. The first angular divergence and lateral spacing are such that the first acoustic wave can reflect off a surface of the liquid and be detected by the transducer but not detected by the receiver. The second angular divergence and lateral spacing are such that the second acoustic wave can reflect off the surface of the liquid and be detected by the receiver.

In an example, the plurality of activation frequencies are resonance frequencies of the piezoelectric element.

In an example, the resonance frequencies are longitudinal or lateral resonance frequencies.

In an example, the acoustic wave launched into the liquid is directed at an angle close to 90 degrees to the second surface of the base plate.

In an example, the transducer is configured such that the angular divergence of the acoustic wave launched into the liquid increases as the activation frequency decreases.

In an example, the angular divergence of the acoustic wave launched into the liquid varies as a function of at least a dimension of the piezoelectric element.

In an example, the angular divergence of the acoustic wave launched into the liquid is large when a speed of sound in the liquid divided by a first range of activation frequencies is greater than a lateral dimension of the piezoelectric element.

In an example, the angular divergence of the acoustic wave launched into the liquid is small when a speed of sound in the liquid divided by a second range of activation frequencies is equal to or less than a lateral dimension of the piezoelectric element.

In an example, the driver electronics is configured to drive the piezoelectric element at two or more frequencies at the same time.

In an example, the base plate can be wedge shaped.

According to an example, the transducer is mounted to the bottom of the vessel.

According to an example, the receiver is mounted to the bottom of the vessel.

Figure 4:
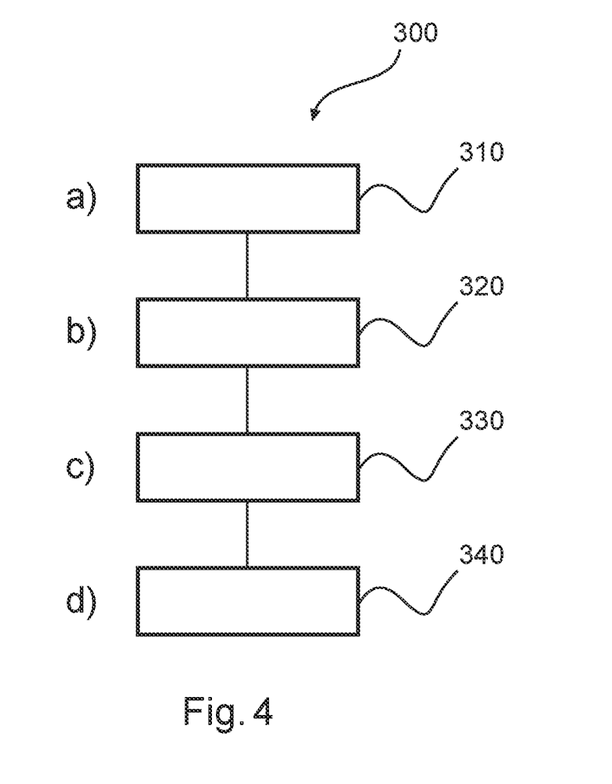
FIG. 4 shows a non-invasive measurement method.

FIG. 4 shows a non-invasive measurement method 300 in its basic steps. The method comprises:
- in a mounting step 310, also referred to as step a), mounting a transducer to a wall of a vessel containing a liquid, wherein the transducer comprises a piezoelectric element, a base plate, and driver electronics, and wherein the piezoelectric element is mounted to a first face of the base plate, and wherein a second face of the base plate is mounted to a wall of the vessel at a first position; wherein, the driver electronics is configured to drive the piezoelectric element at a plurality of activation frequencies, wherein activation at an activation frequency is configured to excite acoustic waves in the base plate and to launch an acoustic wave into the liquid and wherein the transducer is configured such that an angular divergence of the acoustic wave launched into the liquid varies as a function of at least the activation frequency;
- in a mounting step 320, also referred to as step b), mounting a receiver to the wall of the vessel at a second position laterally spaced from the first position;
- in a driving step 330, also referred to as step c), driving the piezoelectric element at a first activation frequency to launch a first acoustic wave into the liquid having a first angular divergence; and
- in a driving step 340, also referred to as step d), driving the piezoelectric element at a second activation frequency to launch a second acoustic wave into the liquid having a second angular divergence greater than the first angular divergence; wherein, the first angular divergence and lateral spacing are such that the first acoustic wave reflects off a surface of the liquid and is detected by the transducer but is not detected by the receiver, and wherein the second angular divergence and lateral spacing are such that the second acoustic wave reflects off the surface of the liquid and is detected by the receiver.

According to an example, the transducer is mounted to the bottom of the vessel.

According to an example, the receiver is mounted to the bottom of the vessel.

Figure 5:
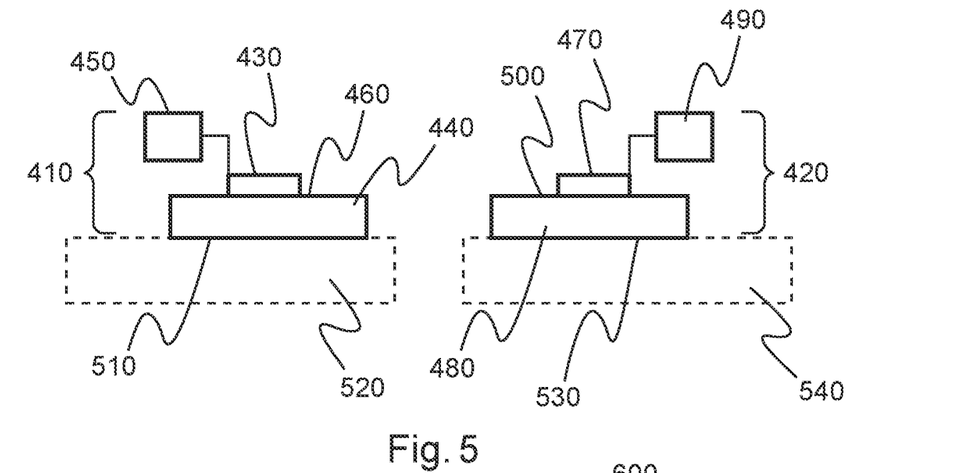
FIG. 5 shows a schematic representation of a transducer system for non-invasive measurement.

FIG. 5 shows an example of a transducer system 400 for non-invasive measurement. The transducer system comprises a first transducer 410, and a second transducer 420. The first transducer comprises a first piezoelectric element 430, a first base plate 440, and first driver electronics 450. The first piezoelectric element is mounted to a first face 460 of the first base plate. The second transducer comprises a second piezoelectric element 470, a second base plate 480, and second driver electronics 490. The second piezoelectric element is mounted to a first face 500 of the second base plate. A second face 510 of the first base plate is mounted to a side wall 520 of a vessel containing a liquid to mount the first transducer to the vessel. A second face 530 of the second base plate is mounted to a bottom wall 540 of the vessel to mount the second transducer to the vessel. The first driver electronics is configured to drive the first piezoelectric element at an activation frequency to activate the first transducer to launch a first acoustic wave into the liquid having a first angular divergence. The second driver electronics is configured to drive the second piezoelectric element at an activation frequency to activate the second transducer to launch a second acoustic wave into the liquid having a second angular divergence greater than the first angular divergence. The first transducer is configured to detect a reflected acoustic wave of the first acoustic wave. The second transducer is positioned such that the second acoustic wave can reflect off the surface of the liquid and be detected by the second transducer.

It is to be noted, that a single driver electronics can be used to drive both the first and second piezoelectric elements. Thus, the same driver electronics is shared across both transducers.

According to an example, the second driver electronics is configured to drive the second piezoelectric element at a plurality of activation frequencies. The second transducer is configured such that the angular divergence of the second acoustic wave launched into the liquid varies as a function of at least the activation frequency.

According to an example, the first driver electronics is configured to drive the first piezoelectric element at a plurality of activation frequencies. The first transducer is configured such that the angular divergence of the second acoustic wave launched into the liquid varies as a function of at least the activation frequency.

Figure 6:
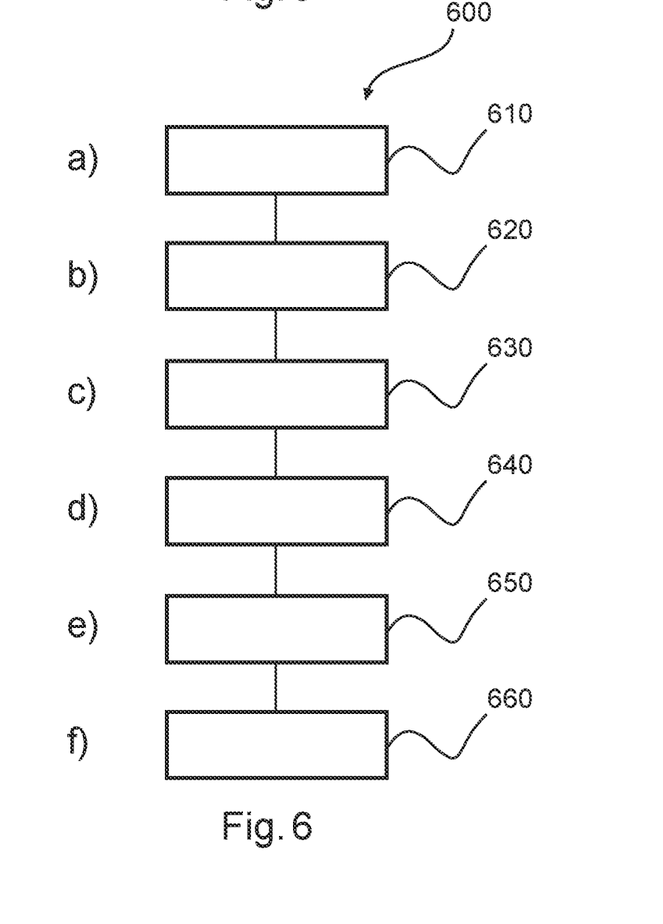
FIG. 6 shows a non-invasive measurement method.

FIG. 6 shows a non-invasive measurement method 600 in its basic steps. The method comprises:
- in a mounting step 610, also referred to as step a), mounting a first transducer to a vessel containing a liquid, wherein the first transducer comprises a first piezoelectric element, a first base plate, and first driver electronics, wherein the first piezoelectric element is mounted to a first face of the first base plate, and wherein, a second face of the first base plate is mounted to a side wall of the vessel to mount the first transducer to the vessel;
- in a mounting step 620, also referred to as step b), mounting a second transducer to the vessel, wherein the second transducer comprises a second piezoelectric element, a second base plate, and second driver electronics, wherein the second piezoelectric element is mounted to a first face of the second base plate, wherein a second face of the second base plate is mounted to a bottom wall of the vessel to mount the second transducer to the vessel;
- in a driving step 630, also referred to as step c), driving the first piezoelectric element with the first driver electronics at an activation frequency to activate the first transducer to launch a first acoustic wave into the liquid having a first angular divergence;
- in a driving step 640, also referred to as step d), driving the second piezoelectric element with the second driver electronics at an activation frequency to activate the second transducer to launch a second acoustic wave into the liquid having a second angular divergence greater than the first angular divergence;
- in a detecting step 650, also referred to as step e), detecting with the first transducer a reflected first acoustic wave, and
- in a detecting step 660, also referred to as step f), detecting with the second transducer a reflected second acoustic wave that has been reflected off a surface of the liquid.

According to an example, the second driver electronics is configured to drive the second piezoelectric element at a plurality of activation frequencies. The second transducer is configured such that the angular divergence of the second acoustic wave launched into the liquid varies as a function of at least the activation frequency.

According to an example, the first driver electronics is configured to drive the first piezoelectric element at a plurality of activation frequencies. The first transducer is configured such that the angular divergence of the second acoustic wave launched into the liquid varies as a function of at least the activation frequency.

The transducer for non-invasive measurement and non-invasive measurement method and transducer systems for non-invasive measurement and associated methods are now described in more detail with reference to FIGS. 7-12.

Figure 7:
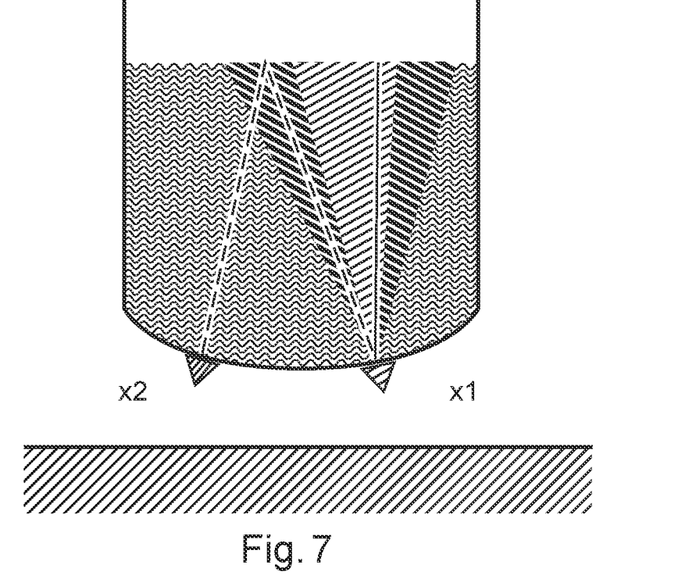
FIG. 7 shows an example of a single transmitter or transducer being used for the measurement of fluid level and sound speed.
Figure 8:
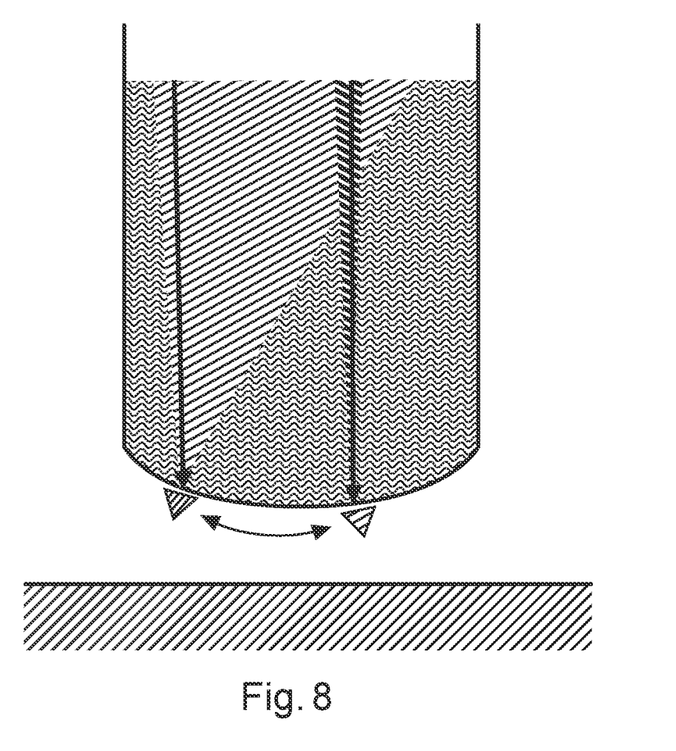
FIG. 8 shows an example of flexible positioning of a transducer on round tank bottoms.
Figure 9:
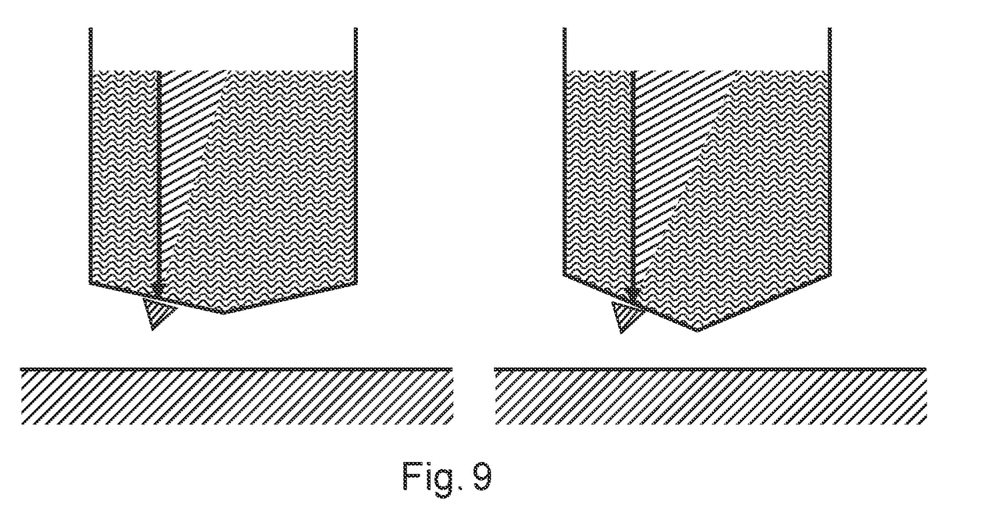
FIG. 9 shows an example of the applicability of a single transducer on conical tank bottoms or various opening angles.
Figure 10:
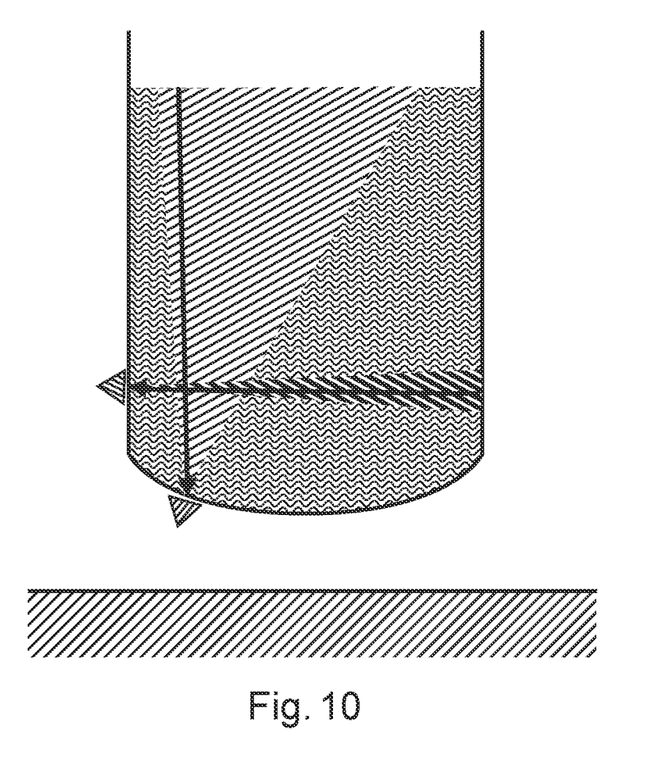
FIG. 10 shows an example of the application of two transducers for fluid level and sound speed measurement.

FIG. 7 shows a single transducer being used for the measurement of level in sound speed. In this example, a low divergence beam is generated by the piezoelectric element being operated at one of the thickness resonant frequencies. A high divergence beam is generated by the piezoelectric element being operated at one of the lateral resonance frequencies, where $f_{r,\ thickness} > f_{r,\ lateral}$. In this way, the sound speed and the level can be measured through the use of two different sound paths between a transducer and a receiver (high divergence beam) and from the transducer back to the transducer (low divergence beam). Details of the use of two such sound paths for the measurement of sound speed level can be found for example in EP3115779A1. Thus, there are two paths one measuring the direct reflection from the liquid surface from the emitting transducer under a first angle back to the emitting transducer, and one measuring the direct reflection from the liquid surface from the emitting transducer under a second angle to a second transducer or receiver. The use of the same transducer with different angular emission patterns now allows the optimization of the signal amplitude for both measurements. In addition, the control of the beam profile allows flexible positioning of the transducer on round bottoms as shown in FIG. 8, the application of the same transducer for various opening angles on conical bottoms as shown in FIG. 9 and using the same transducer for level measurement to the bottom and sound speed calibration for the sidewall as shown in FIG. 10.

Figure 11:
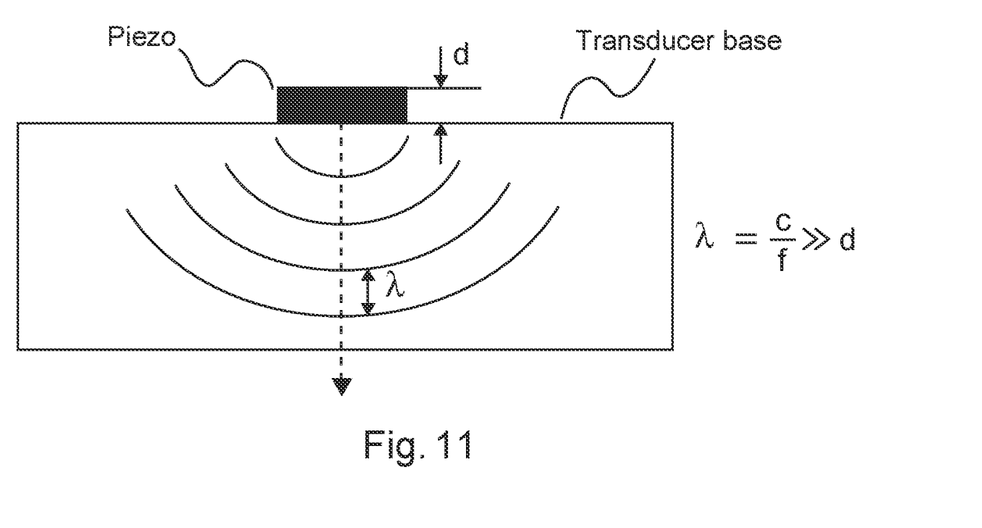
FIG. 11 shows an example of a transducer with high beam divergence.
Figure 12:
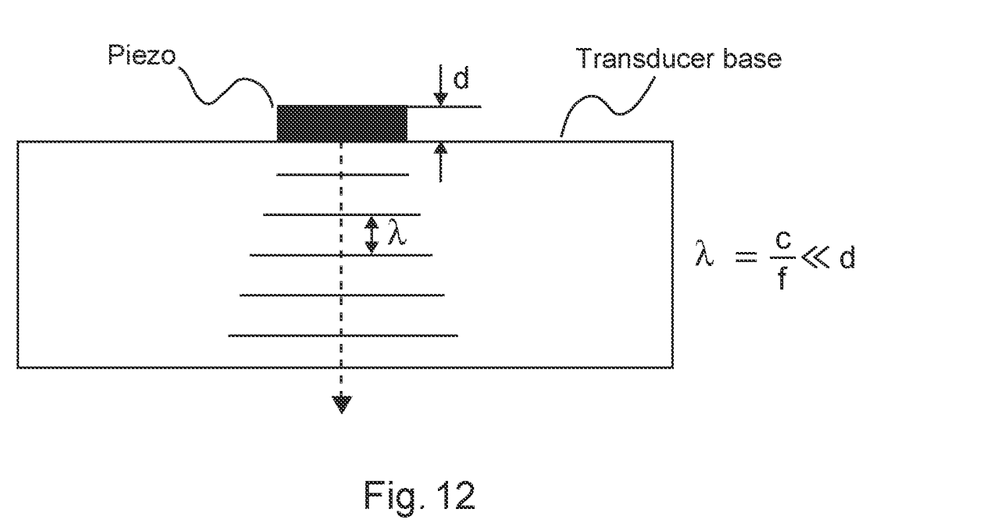
FIG. 12 shows an example of a transducer with low beam divergence.

FIG. 11 shows a transducer with a high beam divergence, and FIG. 12 shows a transducer with a low beam divergence. Piezoelectric driven transducers or actuators can be treated as electromechanical oscillator systems, which are characterized by their resonance frequencies. If the piezoelectric element is operated at its thickness resonance frequencies, it will excite primarily longitudinal acoustic waves that penetrate the tank or pipe wall and radiate in the medium in a normal direction to the transducer plane. The divergence of the beam is governed by the diffraction phenomenon and is therefore proportional to the ratio of wavelength divided by its lateral dimension. The wavelength can be controlled by the excitation frequency. If the wavelength is large compared to the piezoelectric dimensions, the element can be treated as a point source, which emits spherical or spherical like waves with high beam divergence as shown in FIG. 11, where c is the speed of sound, f is actuation frequency, d is piezoelectric element thickness, D is the lateral dimension of the piezoelectric element, and λ is wavelength. In contrast, if the wavelength is close to or lower than the lateral dimension(s) of the piezoelectric element, plane like wave fronts with low beam divergence are emitted as shown in FIG. 12. The piezoelectric element can also be operated at its lateral resonance frequencies. Due to acoustic mode coupling in the piezoelectric element, longitudinal modes will also be excited at the same time, typically with somewhat low intensity. This allows for extending the possible operational frequencies and thus the adjustability of beam divergence. It is possible to operate the piezoelectric element outside the resonance, but this can compromise the efficiency. Choosing the appropriate shape and dimensions of the piezoelectric element, the piezoelectric element and base material, enables a realisation of the required resonance frequencies, which are appropriate for a particular application.

In summary, the operation of the piezoelectric element at the appropriate resonance frequency allows selection of a desired angular emission pattern, i.e. different beam divergence. The excitation at different frequencies may take place either simultaneously (in this case, frequency filtering at the receivers can be employed) or sequentially. For example, from the different level signals that reach the receiver, the one with the largest amplitude can be selected. Results from the measurements can be combined to allow angular resolution.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A transducer for non-invasive measurement, comprising:
    a piezoelectric element;
    a base plate; and
    driver electronics,
    wherein the piezoelectric element is mounted to a first face of the base plate,
    wherein a second face of the base plate is configured to be mounted to a wall of a vessel configured to hold a liquid,
    wherein the driver electronics are configured to drive the piezoelectric element at a plurality of activation frequencies, wherein the plurality of activation frequencies are resonance frequencies of the piezoelectric element, and wherein the resonance frequencies are longitudinal resonance frequencies,
    wherein the driver electronics are configured to drive the piezoelectric element at two or more frequencies at a same time,
    wherein when the second face of the base plate is mounted to the wall of the vessel, the transducer when activated is configured to excite acoustic waves in the base plate and to launch an acoustic wave into the liquid,
    wherein the transducer is configured such that an angular divergence of the acoustic wave launched into the liquid varies as a function of at least the activation frequency and a dimension of the piezoelectric element, wherein the driver electronics is configured to vary the angular divergence of the acoustic wave launched into the liquid from a first angular divergence to a second divergence by changing the activation frequency from a first resonance frequency of the piezoelectric element to a second resonance frequency of the piezoelectric element, and wherein the transducer is configured such that the angular divergence of the acoustic wave launched into the liquid increases as the activation frequency decreases, and
    wherein the acoustic wave launched into the liquid is directed at an angle close to 90 degrees to the second face of the base plate.

2. The transducer according to claim 1, wherein the angular divergence of the acoustic wave launched into the liquid is large when a speed of sound in the liquid divided by a first range of activation frequencies is greater than a lateral dimension of the piezoelectric element.

3. The transducer according to claim 2, wherein the angular divergence of the acoustic wave launched into the liquid is small when a speed of sound in the liquid divided by a second range of activation frequencies is equal to or less than a lateral dimension of the piezoelectric element.

4. The transducer according to claim 1, wherein the base plate is wedge shaped.

5. A non-invasive measurement method, comprising:
    a) mounting a transducer to a vessel containing a liquid, the transducer comprising a piezoelectric element, a base plate, and driver electronics, the piezoelectric element being mounted to a first face of the base plate, a second face of the base plate being mounted to a wall of the vessel, the vessel being configured to hold a liquid, and the driver electronics being configured to drive the piezoelectric element at a plurality of activation frequencies, wherein the plurality of activation frequencies are resonance frequencies of the piezoelectric element, and wherein the resonance frequencies are longitudinal resonance frequencies; and
    b) activating the piezoelectric element by the driver electronics to excite acoustic waves in the base plate and launch an acoustic wave into the liquid, the driver electronics being configured to drive the piezoelectric element at a plurality of activation frequencies, and an angular divergence of the acoustic wave launched into the liquid varying as a function of at least the activation frequency and a dimension of the piezoelectric element, wherein the acoustic wave launched into the liquid is directed at an angle close to 90 degrees to the second face of the base plate, wherein the driver electronics are configured to drive the piezoelectric element at two or more frequencies at a same time, wherein the driver electronics is configured to vary the angular divergence of the acoustic wave launched into the liquid from a first angular divergence to a second divergence by changing the activation frequency from a first resonance frequency of the piezoelectric element to a second resonance frequency of the piezoelectric element, and wherein the transducer is configured such that the angular divergence of the acoustic wave launched into the liquid increases as the activation frequency decreases.

6. A transducer system for non-invasive measurement, comprising:
    a transducer comprising a piezoelectric element, a base plate, and driver electronics; and
    a receiver,
    wherein the driver electronics comprise a part of the transducer or a physically separate unit,
    wherein the piezoelectric element is mounted to a first face of the base plate,
    wherein a second face of the base plate is mounted to a wall of a vessel containing a liquid at a first position to mount the transducer to the wall of the vessel,
    wherein the receiver is mounted to the wall of the vessel at a second position laterally spaced from the first position,
    wherein the driver electronics are configured to drive the piezoelectric element at a plurality of activation frequencies, activation at an activation frequency being configured to excite acoustic waves in the base plate and to launch an acoustic wave into the liquid, the transducer being configured such that an angular divergence of the acoustic wave launched into the liquid varies as a function of at least the activation frequency and an emitter dimension, wherein the plurality of activation frequencies are resonance frequencies of the piezoelectric element, and wherein the resonance frequencies are longitudinal resonance frequencies, wherein the driver electronics are configured to drive the piezoelectric element at two or more frequencies at a same time, wherein the transducer is configured to launch a first acoustic wave into the liquid having a first angular divergence via excitation of the piezoelectric element at a first resonance frequency and to launch a second acoustic wave into the liquid having a second angular divergence greater than the first angular divergence via excitation of the piezoelectric element at a second resonance frequency lower than the first resonance frequency, wherein the first acoustic wave launched into the liquid is directed at an angle close to 90 degrees to the base plate, wherein the first angular divergence and lateral spacing are such that the first acoustic wave is reflectable off a surface of the liquid and detectable by the transducer but not by the receiver, and wherein the second angular divergence and lateral spacing are such that the second acoustic wave is reflectable off the surface of the liquid and detectable by the receiver.

7. The transducer system according to claim 6, wherein the transducer is mounted to a bottom of the vessel.

8. The transducer system according to claim 6, wherein the receiver is mounted to a bottom of the vessel.

9. A non-invasive measurement method, comprising:
a) mounting a transducer to a wall of a vessel containing a liquid, the transducer comprising a piezoelectric element, a base plate, and driver electronics, the piezoelectric element being mounted to a first face of the base plate, a second face of the base plate being mounted to a wall of the vessel at a first position, the driver electronics being configured to drive the piezoelectric element at a plurality of activation frequencies, wherein the driver electronics are configured to drive the piezoelectric element at two or more frequencies at a same time, wherein activation at an activation frequency is configured to excite acoustic waves in the base plate and to launch an acoustic wave into the liquid, the transducer being configured such that an angular divergence of the acoustic wave launched into the liquid varies as a function of at least the activation frequency and an emitter dimension, wherein the plurality of activation frequencies are resonance frequencies of the piezoelectric element, and wherein the resonance frequencies are longitudinal resonance frequencies;
b) mounting a receiver to the wall of the vessel at a second position laterally spaced from the first position;
c) driving the piezoelectric element at a first activation resonance frequency to launch a first acoustic wave into the liquid having a first angular divergence, wherein the first acoustic wave launched into the liquid is directed at an angle close to 90 degrees to the base plate; and
d) driving the piezoelectric element at a second activation resonance frequency lower than the first activation resonance frequency to launch a second acoustic wave into the liquid having a second angular divergence greater than the first angular divergence, the first angular divergence and lateral spacing being such that the first acoustic wave reflects off a surface of the liquid and is detected by the transducer but not the receiver, the second angular divergence and lateral spacing being such that the second acoustic wave reflects off the surface of the liquid and is detected by the receiver.

10. The method according to claim 9, wherein the transducer is mounted to a bottom of the vessel.

11. The method according to claim 9, wherein the receiver is mounted to a bottom of the vessel.

\* \* \* \* \*